(12) United States Patent
Pelton et al.

(10) Patent No.: US 12,223,959 B2
(45) Date of Patent: Feb. 11, 2025

(54) MODIFYING SPOKEN COMMANDS

(71) Applicant: Hewlett-Packard Development Company, L.P., Spring, TX (US)

(72) Inventors: Gregory Pelton, Raleigh, NC (US); Kwan Truong, Lilburn, GA (US); Cody Schnacker, Westminster, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/385,890

(22) Filed: Oct. 31, 2023

(65) Prior Publication Data

US 2024/0062759 A1    Feb. 22, 2024

Related U.S. Application Data

(63) Continuation of application No. 15/934,317, filed on Mar. 23, 2018, now abandoned.

(51) Int. Cl.
| | |
|---|---|
| *G10L 15/22* | (2006.01) |
| *G06F 3/16* | (2006.01) |
| *G10L 15/08* | (2006.01) |
| *G10L 15/26* | (2006.01) |
| *G10L 15/30* | (2013.01) |
| *G10L 21/00* | (2013.01) |

(52) U.S. Cl.
CPC ............. *G10L 15/22* (2013.01); *G06F 3/167* (2013.01); *G10L 15/08* (2013.01); *G10L 15/26* (2013.01); *G10L 2015/088* (2013.01); *G10L 2015/223* (2013.01); *G10L 15/30* (2013.01); *G10L 21/00* (2013.01)

(58) Field of Classification Search
CPC ......... G10L 15/22; G10L 15/08; G10L 15/26; G10L 15/30; G10L 21/00; G10L 2015/088; G10L 2015/22; G06F 3/167
See application file for complete search history.

(56) References Cited

U.S. PATENT DOCUMENTS

| | | | |
|---|---|---|---|
| 6,985,865 B1 | 1/2006 | Packingham et al. | |
| 7,313,525 B1 | 12/2007 | Packingham et al. | |
| 8,380,521 B1 | 2/2013 | Maganti et al. | |
| 10,489,103 B1 | 11/2019 | Gruebele | |
| 11,295,735 B1 * | 4/2022 | Anuar | G10L 15/30 |
| 2010/0023329 A1 | 1/2010 | Onishi | |

(Continued)

FOREIGN PATENT DOCUMENTS

WO    2017/184169 A1    10/2017

OTHER PUBLICATIONS

Int'l Search Report & Written Opinion received in copending PCT Application No. PCT/US2019/023538 dated May 20, 2019, pp. 11.

*Primary Examiner* — Mark Villena
(74) *Attorney, Agent, or Firm* — Quarles & Brady LLP

(57) ABSTRACT

A method includes obtaining, at a first conference endpoint device, spoken command data representing a spoken command detected by the first conference endpoint device during a teleconference between the first conference endpoint device and a second conference endpoint device. The method further includes generating modified spoken command data by inserting a spoken phrase into the spoken command. The method further includes transmitting the modified spoken command data to a natural language service.

20 Claims, 9 Drawing Sheets

(56) References Cited

U.S. PATENT DOCUMENTS

| | | |
|---|---|---|
| 2011/0288859 A1 | 11/2011 | Taylor et al. |
| 2016/0239259 A1 | 8/2016 | Lenchner et al. |
| 2017/0040018 A1 | 2/2017 | Tormey |
| 2017/0110123 A1 | 4/2017 | Sharifi et al. |
| 2017/0110144 A1 | 4/2017 | Sharifi et al. |
| 2017/0154628 A1 | 6/2017 | Mohajer et al. |
| 2017/0169819 A1* | 6/2017 | Mese ............... G10L 15/22 |
| 2018/0012597 A1 | 1/2018 | Mathias et al. |
| 2018/0233141 A1 | 8/2018 | Solomon et al. |
| 2018/0240460 A1 | 8/2018 | Matsumoto et al. |
| 2019/0005956 A1 | 1/2019 | Bhattacharya et al. |
| 2019/0027138 A1 | 1/2019 | Wang et al. |
| 2019/0102145 A1* | 4/2019 | Wilberding ...... H04N 21/43615 |
| 2019/0108221 A1 | 4/2019 | Nelson et al. |
| 2019/0206396 A1 | 7/2019 | Chen |
| 2019/0279622 A1 | 9/2019 | Liu et al. |

\* cited by examiner

MODIFYING SPOKEN COMMANDS

RELATED APPLICATIONS

This application is a continuation of U.S. patent application Ser. No. 15/934,317 filed on Mar. 23, 2018, the entire contents of which is incorporated herein by reference.

TECHNICAL FIELD

The present disclosure relates generally to detecting and then modifying spoken commands.

BACKGROUND

Speech recognition systems are becoming increasingly popular means for users to interact with computing devices. A variety of speech recognition services enable users to control such computing devices and gain information without the need for a visual user interface, buttons, or other controls. To illustrate, a speech recognition service can change the channel on a television, control lights or doors, look up news, or perform a variety of other tasks based on detected speech. These speech recognition services are often responsive to a 'wake word' or phrase that indicates to the speech recognition service that a spoken command may follow. Further, these speech recognition services often are responsive to phrases that indicate the speech recognition service is to interact with a third party service. In an illustrative example, a speech recognition system is configured to search an incoming audio stream for the wake up phrase, and, in response to detecting the wake up phrase, the speech recognition system begins to respond to spoken commands included in the audio stream. In response to determining that a particular spoken command includes words associated with a third party service, the speech recognition service is configured to interact with the third party service.

Unfortunately, users may forget to use the wake up phrase prior to issuing a spoken command. In such cases, the speech recognition system ignores the user's spoken command. Further, users may forget to say the words associated with the third party service when trying to interact with the third party service. In such cases, the speech recognition system attempts to process the user's spoken command without interacting with the third party service.

SUMMARY

Systems and methods according to the disclosure enable a communication device to modify a spoken command. In some examples, modifying a spoken command includes adding a wake up phrase to the spoken command prior to transmitting the spoken command to a speech recognition service. In some examples, modifying the spoken command includes adding a phrase associated with a third party service to the spoken command prior to transmitting the spoken command to the speech recognition service. Accordingly, the systems and methods enable a user to issue the spoken command to the speech recognition service without saying a wake-up word or phrase associated with the speech recognition service. Further, the systems and methods enable the user to issue the spoken command to a third party service without saying a phrase or word associated with the third party service.

A method includes obtaining, at a first conference endpoint device, spoken command data representing a spoken command detected by the first conference endpoint device during a teleconference between the first conference endpoint device and a second conference endpoint device. The method further includes generating modified spoken command data by inserting the spoken phrase into the spoken command. The method further includes transmitting the modified spoken command data to a natural language service.

A computer readable storage medium stores instructions that, when executed by one or more processors, cause the one or more processors to perform operations comprising obtaining, at a first conference endpoint device, spoken command data representing a spoken command detected by the first conference endpoint device during a teleconference between the first conference endpoint device and a second conference endpoint device. The operations further include generating modified spoken command data by inserting the spoken phrase into the spoken command. The operations further include transmitting the modified spoken command data to a natural language service.

An apparatus includes one or more processors and a memory storing instructions that, when executed by the processor, cause the processor to perform operations. The operations include obtaining, at a first conference endpoint device, spoken command data representing a spoken command detected by the first conference endpoint device during a teleconference between the first conference endpoint device and a second conference endpoint device. The operations further include generating modified spoken command data by inserting the spoken phrase into the spoken command. The operations further include transmitting the modified spoken command data to a natural language service.

DESCRIPTION OF THE DRAWINGS

Embodiments described herein are illustrated by way of example and not limitation in the figures of the accompanying drawings, in which like references indicate similar features. It should be understood that the full scope of the inventions disclosed herein are not limited to the precise arrangements, dimensions, and instruments shown. Furthermore, in the drawings, some conventional details have been omitted so as not to obscure the inventive concepts described herein.

DETAILED DESCRIPTION

Figure 1:
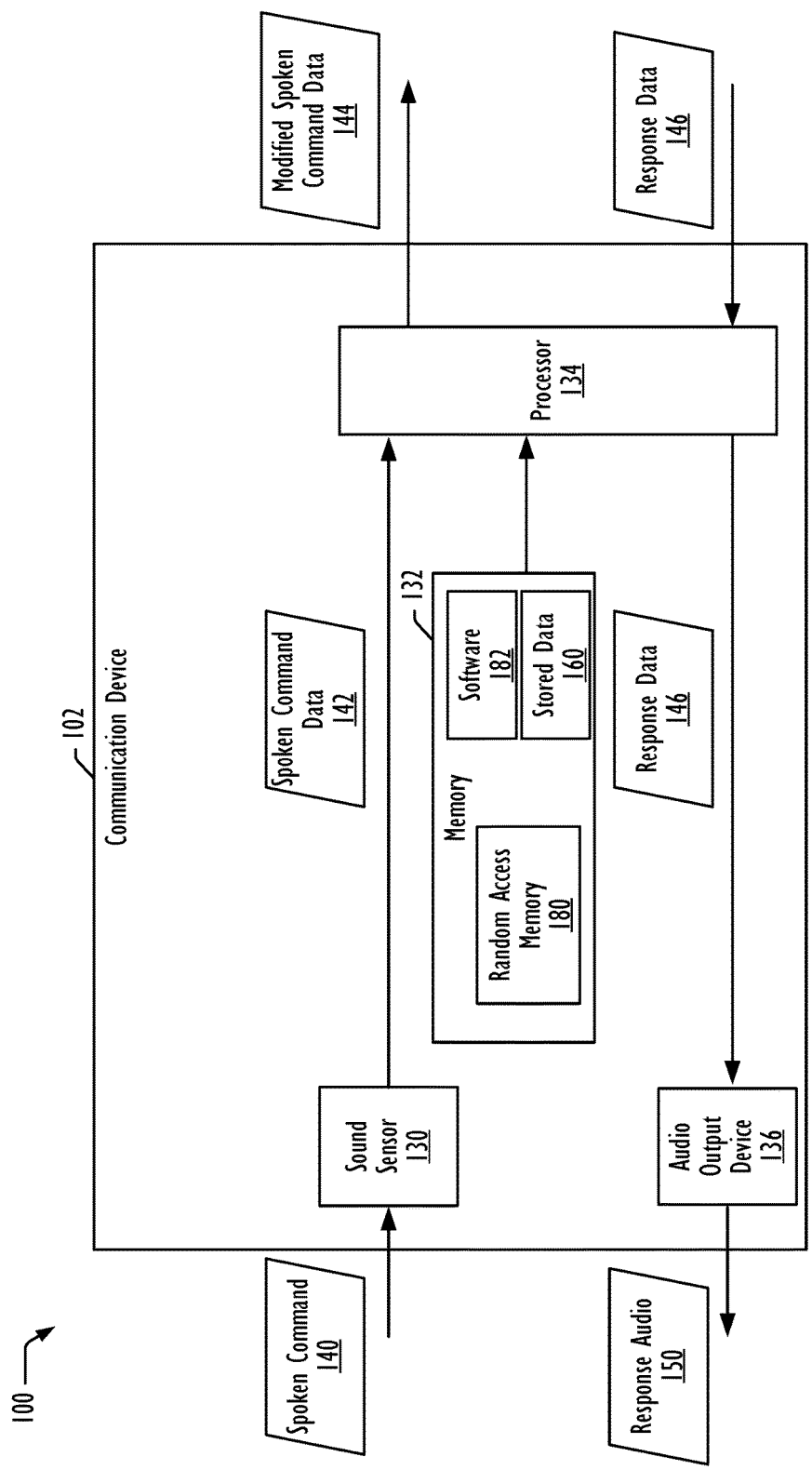
FIG. 1 is a diagram illustrating a communication device for modifying spoken commands is shown.

Reference to the drawings illustrating various views of exemplary embodiments is now made. In the following description, numerous specific details are set forth, such as specific configurations, methods, etc., in order to provide a thorough understanding of the embodiments. At least one of the described embodiments is practicable without one or more of these specific details, or in combination with other known methods and configurations. In other instances, well-known processes and techniques have not been described in particular detail to avoid obscuring the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one implementation. Thus, the appearances of the phrase "in one embodiment," "in an embodiment," "in another embodiment," "in other embodiments," "in some embodiments," or their variations in various places throughout this specification are not necessarily referring to the same embodiment. Furthermore, the particular features, structures, configurations, or characteristics are combinable in any suitable manner in one or more embodiments. In the drawings and the description of the drawings herein, certain terminology is used for convenience only and is not to be taken as limiting the embodiments of the present disclosure. Furthermore, in the drawings and the description below, like numerals indicate like elements throughout.

In the following description and claims, the terms "coupled" and "connected," along with their derivatives, are not intended as synonyms for each other. "Coupled" is used to indicate that two or more elements or components can directly or indirectly communicate with each other. "Connected" is used to indicate that two or more elements or components are directly linked with each other.

Any marks that have been referenced herein is by way of example and shall not be construed as descriptive or to limit the scope of the embodiments described herein to material associated only with such marks.

The present disclosure enables one of skill in the art to provide a system to generate a modified spoken command data by inserting one or more spoken phrases into a spoken command. In a particular example, the system detects spoken command "play rock music." In response to the spoken command, the system generates an audio waveform representing the phrase "play rock music" and modifies the waveform by adding another phrase, such as "Wake up!" Accordingly, the system generates a modified audio waveform representing the phrase "Wake up! Play rock music." In some implementations, the system is further configured to generate the modified spoken command data by removing a one or more phrases from the representation of the spoken command. Referring back to the previous example, the system may delete the word "music" From the audio waveform. Accordingly, the modified audio waveform may represent the phrase "Wake up! Play rock." The system transmits the modified spoken command data to a natural language service for processing.

FIG. 1 illustrates a communication device configured to modify a spoken command. Modifying a spoken command may include adding one or more words to and/or deleting one or more words from the spoken command. In particular, the communication device of FIG. 1 generates a modified spoken command data (e.g., a waveform or other representation) based on stored data that represents a spoken phrase to be added to the spoken command.

Figure 2:
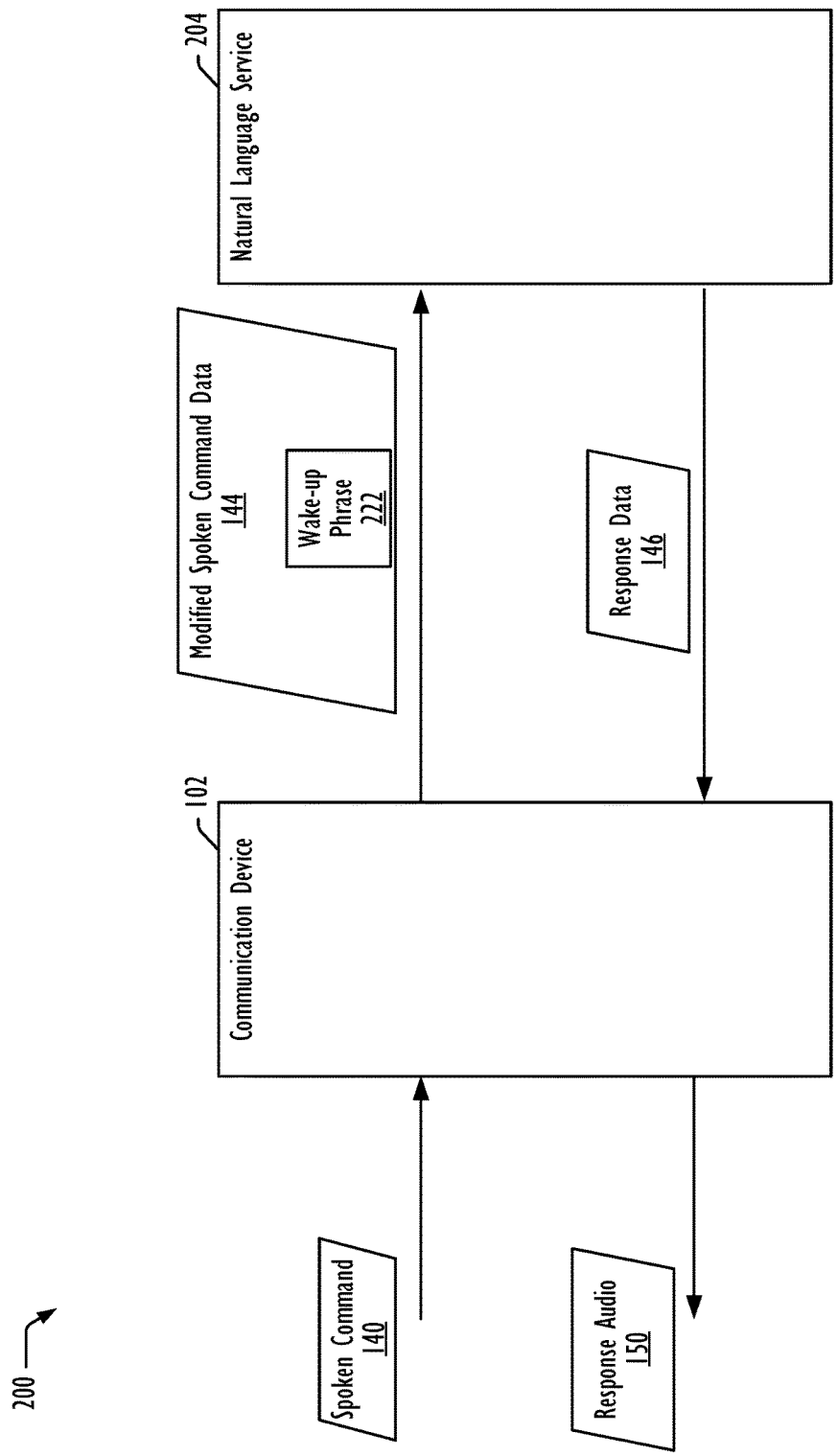
FIG. 2 is a diagram illustrating the communication device modifying the spoken command by inserting a wake-up phrase.
Figure 3:
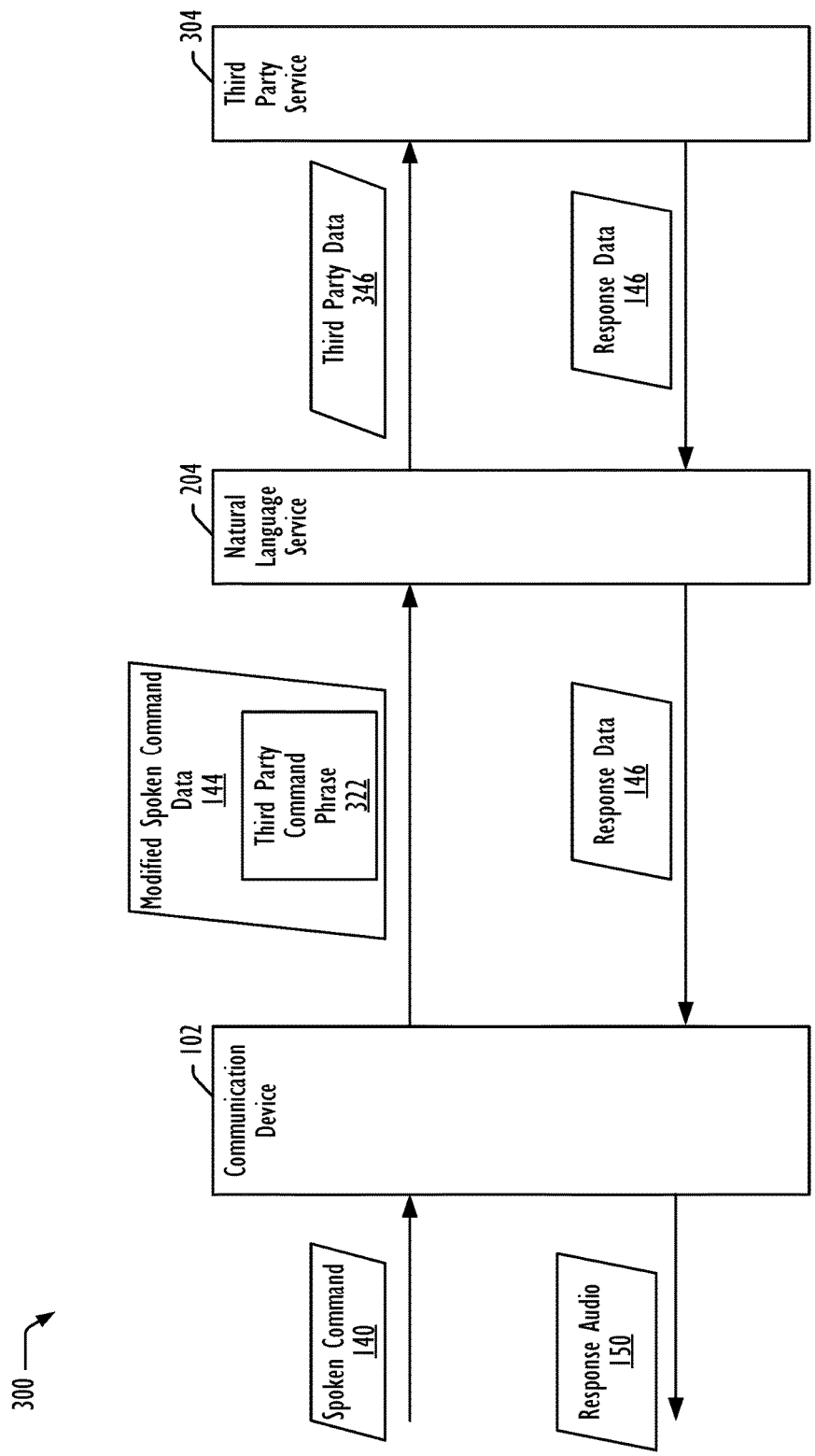
FIG. 3 is a diagram illustrating the communication device modifying the spoken command by inserting a third party command phrase.
Figure 4:
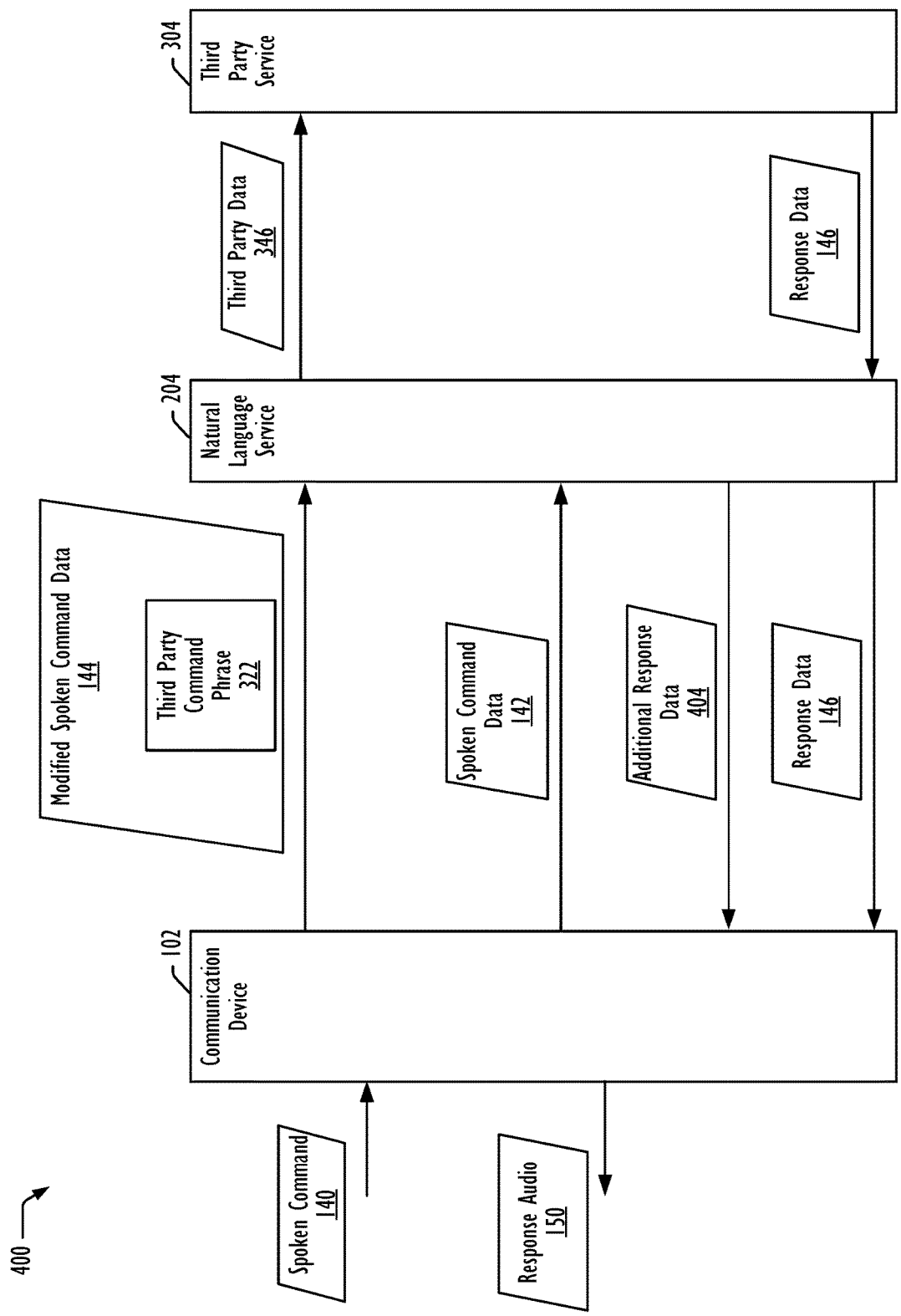
FIG. 4 is a diagram illustrating the communication device modifying the spoken command by inserting the third party command phrase and transmitting the spoken command and the modified spoken command to a natural language service.
Figure 5:
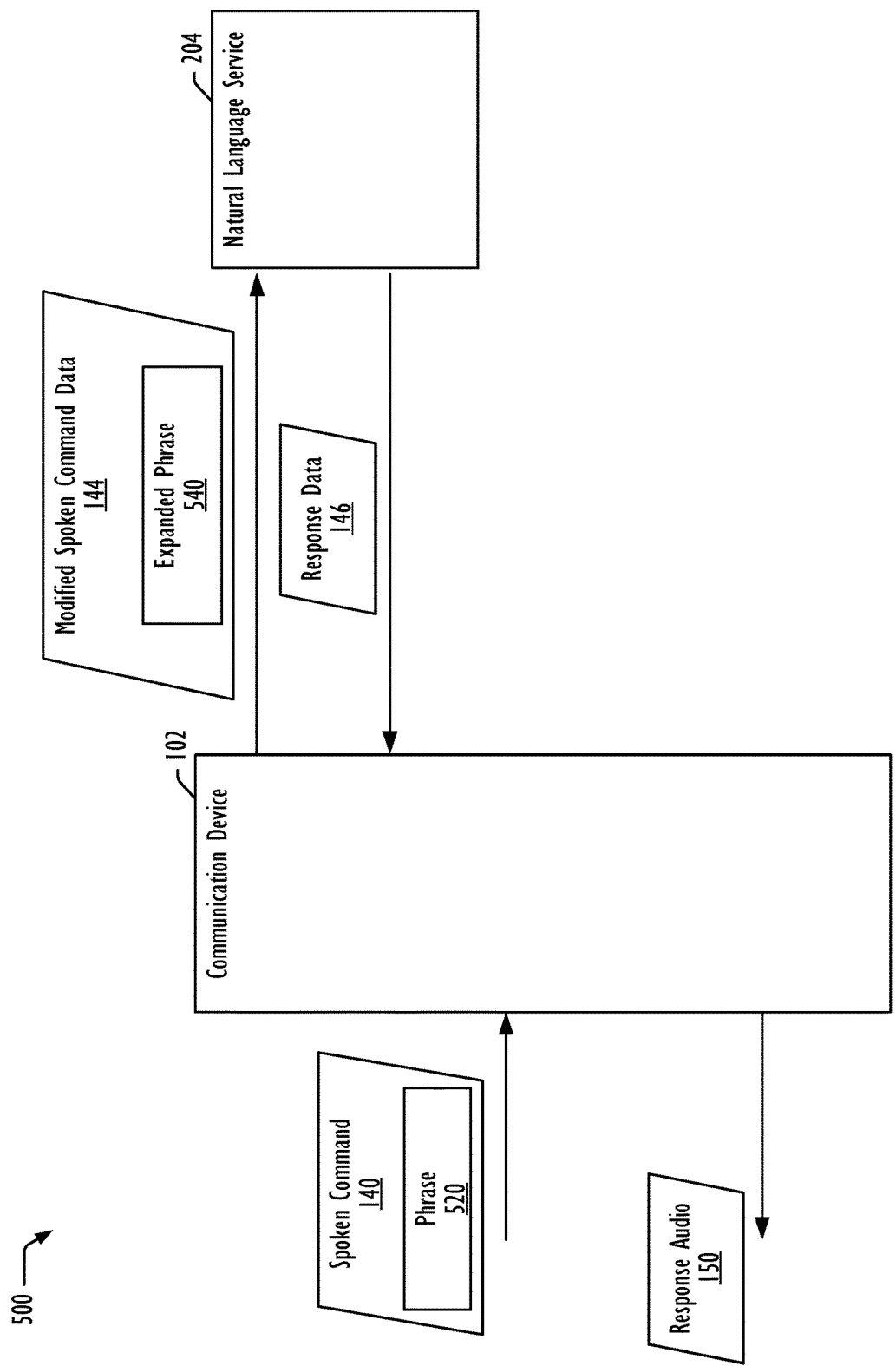
FIG. 5 is a diagram illustrating the communication device modifying the spoken command by expanding or replacing a phrase included in the spoken command.
Figure 6:
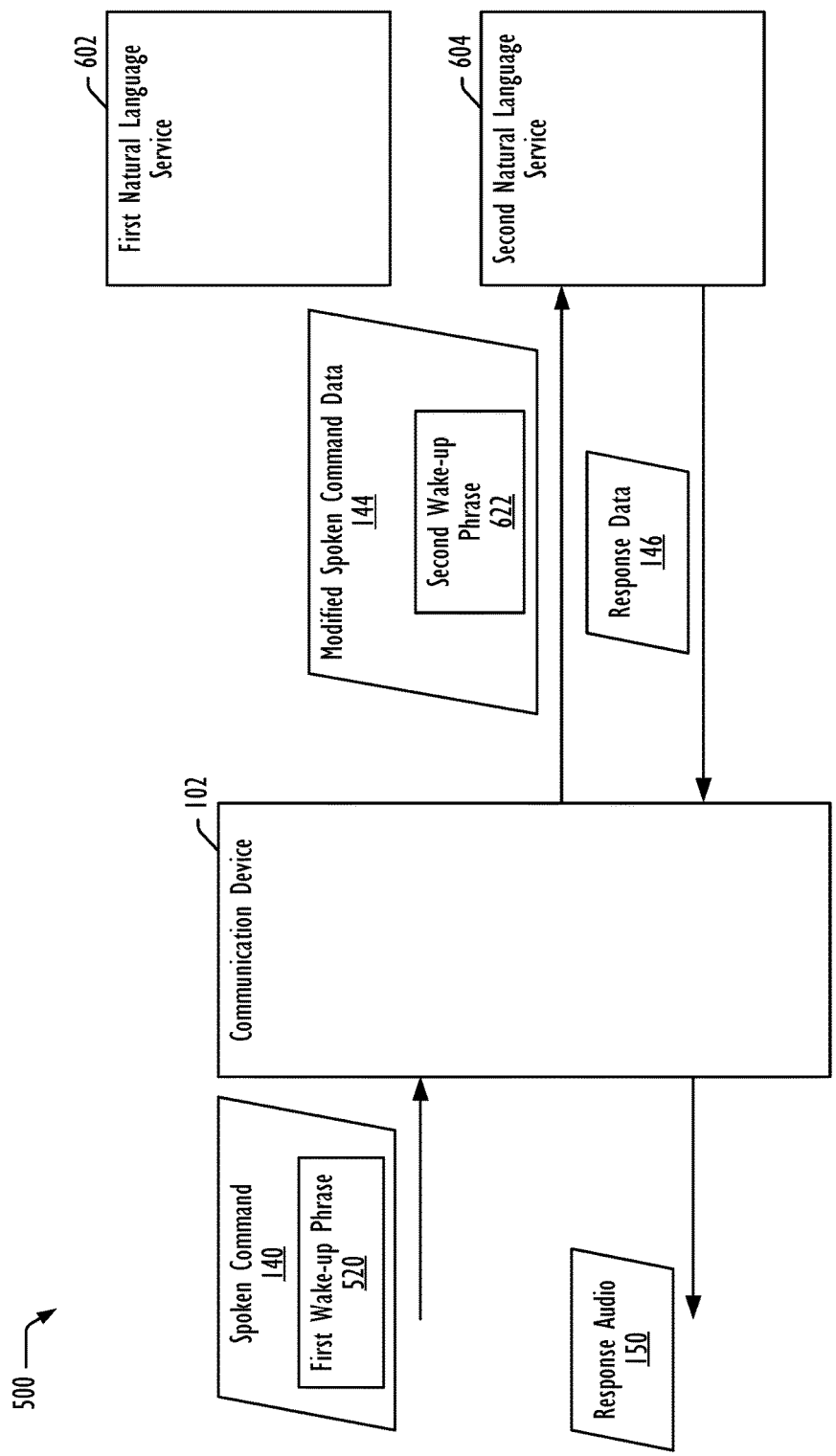
FIG. 6 is a diagram illustrating the communication device modifying the spoken command by removing a first wake-up phrase and inserting a second wake-up phrase.
Figure 7:
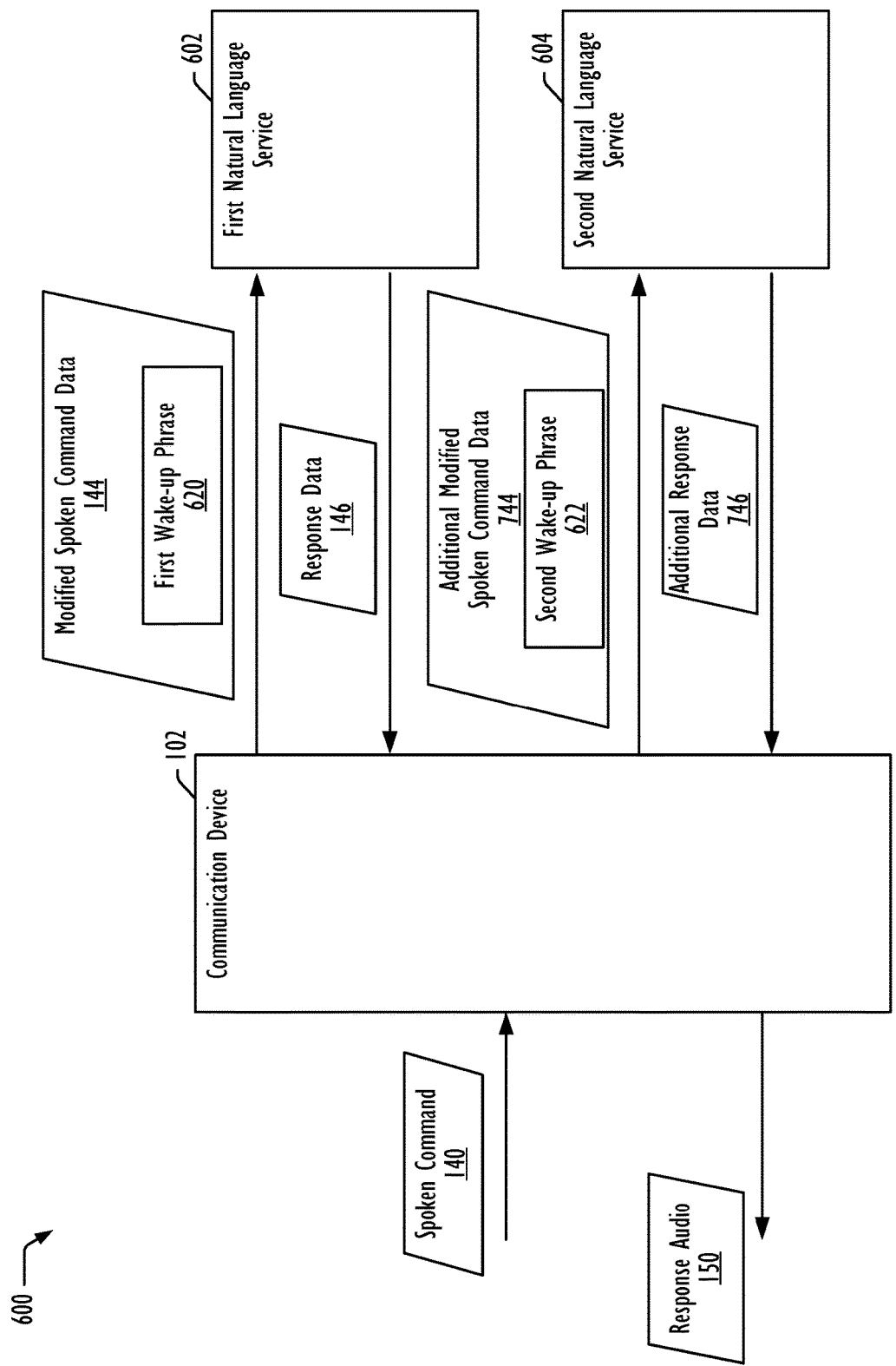
FIG. 7 is a diagram illustrating the communication device generating more than one modified version of the spoken command, where each modified version includes a different wake-up phrase.

FIG. 2 illustrates an example of the communication device modifying the spoken command by adding a wake up phrase to the spoken command. FIG. 3 illustrates an example of the communication device modifying the spoken command by adding a third party command phrase to the spoken command. FIG. 4 illustrates an example of the communication device transmitting both the modified spoken command and the spoken command to the natural language service. FIG. 5 illustrates an example of the communication device modifying the spoken command by expanding or replacing a phrase included in the spoken command. FIG. 6 illustrates an example of the communication device modifying the spoken command by replacing a first wake-up phrase included in the spoken command with a second wake-up phrase. FIG. 7 illustrates an example of the communication device transmitting different modified versions of the spoken command to distinct natural language services. Each modified version of the spoken command includes a wake-up phrase associated with the corresponding destination natural language service.

Referring to FIG. 1, a diagram 100 illustrating a communication device 102 for modifying spoken commands is shown. In some implementations, the communication device 102 corresponds to a teleconference endpoint device configured to facilitate audio and/or video communication with other teleconference endpoint devices. In other examples, the communication device 102 corresponds to a mobile phone or to another type of computing device configured to receive and process speech.

In the example illustrated in FIG. 1, the communication device 102 includes a sound sensor 130, a memory 132, a processor 134, and an audio output device 136. In some implementations, the communication device 102 includes additional components other than those illustrated. The sound sensor 130 includes a microphone (e.g., a condenser microphone, a dynamic microphone, or to any other type of microphone) and an analog to digital converter (AID). In some examples, the sound sensor 130 includes a plurality of microphones and/or a plurality of A/Ds. The sound sensor 130 is configured to generate sound data based on an acoustic signal detected by the sound sensor 130.

The processor 134 corresponds to a digital signal processor (DSP), a central processor unit (CPU), or to another type of processor. In some implementations, the processor 134 corresponds to a plurality of processor devices. In the illustrative example of FIG. 2, the memory 132 stores software 182 and includes random access memory 180. The communication device 102 is configured to load the software 180 into the random access memory 180 to be executed by the processor 134. The processor 134 is configured to execute the software 182 to perform one or more operations on the data output by the sound sensor 130. In some examples, the memory 132 includes a solid state device, an additional random access memory device, a disk drive, another type of memory, or a combination thereof in addition to the random access memory 180. In some implementations, the memory 132 corresponds to a plurality of memory devices. The processor 134 is further configured to provide output audio data to the audio output device 136.

The audio output data may be based on data generated within the communication device 102, data received from another device, or a combination thereof.

The audio output device 136 includes a speaker and a digital to analog converter (D/A). In some examples, the audio output device 136 includes a plurality of speakers and/or a plurality of D/As. The audio output device 136 is configured to generate an output acoustic signal based on the output audio data received from the processor 134.

In operation, the sound sensor 130 detects a spoken command 140. In a particular use case, a user speaks the spoken command 140 during a teleconference facilitated by the communication device 102. A particular example of the spoken command is "What's the weather like?" In response to detecting the spoken command 140, the sound sensor 130 generates spoken command data 142 representing the spoken command 140.

The processor 134 generates modified spoken command data 144 based on the spoken command data 142 and stored data 160 stored in the memory 132. Generating the modified spoken command data 144 may include deleting one or more words from the spoken command 140, adding one or more words to the spoken command 140, or a combination thereof. In some examples, the stored data 160 represents an audio clip of a spoken phrase (e.g., "Wake up!"), and the processor 134 generates the modified spoken command data 144 by inserting the spoken phrase into the spoken command 140. In an illustrative example, the modified spoken command data 144 represents an audio clip of the spoken phrase "Wake up! What's the weather like?" In some examples, generation of the modified spoken command data 144 includes removing a word or a phrase from the spoken command 140. The processor 134 initiates transmission of the modified spoken command data 144 to a natural language service (not shown). In some examples, the natural language service is external to the communication device 102. In other examples, the natural language service is internal to the communication device 102.

As illustrated in FIG. 1, the communication device 102 receives response data 146 from a natural language service. The response data 146 represents a response to the modified spoken command data 144. The response data 146 represents audio, video, text, or a combination thereof. In a particular illustrative example, the response data 146 corresponds to an audio clip of the phrase "The temperature in your area is 76 degrees, and there is a 20% chance of rain." In another example, the response corresponds to a text and/or audio error message (e.g., "Your command was not recognized").

In the illustrated example, the processor 134 passes the response data 146 to the audio output device 136. In other examples, the processor 134 alters the response data 146 before sending the response data 146 to the audio output device 136. For example, the processor 134 may add and/or remove words or phrases to a response phrase represented by the response data 146. Based on the response data 146 (or a modified version thereof) the audio output device 136 generates response audio 150. For example, the audio output device 136 may generate an acoustic signal corresponding to the spoken phrase "The temperature in your area is 76 degrees, and there is a 20% chance of rain."

Accordingly, in a particular use case, the communication device 102 detects a spoken command "what is the weather like?" (e.g., the spoken command 140) and generates the spoken command data 142 accordingly. The processor 134 modifies the spoken command data 142 by adding the wake up phrase "Wake up!" to the spoken command. Accordingly, in the particular use case, the modified spoken command data 144 corresponds to the phrase "Wake up! What is the weather like?" The processor 134 initiates transmission of the modified spoken command data 144 to a natural language service which processes the phrase "Wake up! What is the weather like?" and generates the response data 146 accordingly. The response data 146 corresponds to the phrase "The temperature in your area is 76 degrees, and there is a 20% chance of rain." The processor 134 sends the response data 146 to the audio output device 136 which outputs the phrase "The temperature in your area is 76 degrees, and there is a 20% chance of rain," as the response audio 150.

Thus, the communication device 102 modifies spoken command data before transmitting the modified spoken command data to a natural language service. Such modification provides a variety of benefits, as explained further below with reference to FIGS. 2-7.

Referring to FIG. 2, a diagram 200 illustrating a use case in which the communication device 102 adds a wake up phrase to a spoken command is shown. In particular, the communication device 102 generates the modified spoken command data 144 by inserting a wake-up phrase 222 into the spoken command 140 before transmitting the modified spoken command data 144 to a natural language service 204. In the example of FIG. 2, the wake-up phrase 222 corresponds to the stored data 160 of FIG. 1. In some implementations, the communication device 102 (i.e., the processor 134 generates the modified spoken command data 144 in response to determining that the spoken command 140 is to be processed by the natural language service 204 but does not include the wake-up phrase 222. The natural language service 204 processes spoken commands conditionally based on detecting the wake-up phrase 222. For example, the natural language service 204 may parse a speech stream to identify and process a spoken command that occurs in the speech stream after an occurrence of the wake-up phrase 222. In some implementations, the natural language service 204 corresponds to one or more devices arranged in a cloud architecture associated with providing the natural language service. For example, a first device of the natural language service 204 may transmit the spoken command (or a representation thereof) to another cloud based device for processing in response to detecting the wake-up phrase 222.

Because the communication device 102 (i.e., the processor 134) inserts the wake-up phrase 222 into the spoken command 140 to generate the modified spoken command data 144 before transmitting the modified spoken command data 144 to the natural language service 204, the natural language service 204 detects the wake-up phrase 222 and provides the response data 146 accordingly. Thus, the communication device 102 enables a user of the communication device 102 to issue effective spoken commands to the natural language service 204 without uttering the wake-up phrase 222 even though the natural language service 204 processes spoken commands conditionally based on detecting the wake-up phrase 222.

The communication device 102 may select the natural language service 204 to process the spoken command 140 based on one or more factors. In some implementations, the one or more factors include costs associated with using the natural language service 204, a policy associated with the communication device 102, historical scores associated with the natural language service 204 processing particular commands, or a combination thereof. The communication device 102 stores or has access to data indicating the costs, the policy, the historical scores, or a combination thereof. An example of a policy is "use natural language service X for spoken command Y." The historical scores may be based on user feedback received at the communication device 102 and/or other communication devices. For example, the communication device 102 may receive user feedback indicating the user's satisfaction with the response audio 150, and the communication device 102 may generate a historical score associated with the natural language service 204 processing the spoken command 140. This historical score may be used in the future by the communication device 102 to determine how to process future spoken commands.

Referring to FIG. 3, a diagram 300 illustrating a use case in which the communication device 102 generates the modified spoken command data 144 by inserting a third party command phrase 322 into the spoken command 140 before transmitting the modified spoken command data 144 to the natural language service 204. The third party command phrase 322 corresponds to the stored data 160 of FIG. 1. In the example of FIG. 3, the communication device 102 is configured to selectively generate the modified spoken command data 144 in response to determining that the spoken command 140 is associated with a third party service 304. For example, the communication device 102 may maintain a data structure (e.g., a table) that indicates which spoken commands are associated with the third party services and, in response to determining that a detected spoken command is associated with a particular third party service, insert a corresponding third party command phrase into the spoken command. In some implementations, the third party service 304 corresponds to an application executed by the natural language service 204 rather than to a separate device. Similarly, the natural language service 204 may correspond to an application executed by the communication device 102.

The natural language service 204 is configured to communicate third party data 346 to a third party service 304 in response to the third party command phrase 322. The third party service 304 provides one or more services that the natural language service 204 may be unable or not configured to provide inherently. Examples of the one or more services include a news service, a teleconference service, a music service, or any other type of service. The third party data 346 is based on the modified spoken command data 144. In a particular implementation, the third party data 346 represents a transcript of the modified spoken command, or a portion thereof, as represented by the modified spoken command data 144. In other examples, the third party data 346 corresponds to an application programming interface (API) call selected by the natural language service 204 based on the modified spoken command data 144.

In the illustrated example, the third party service 304 provides the response data 146 to the natural language service 204 and the natural language service 204 provides the response data 146 to the communication device 102. In other examples, the third party service 304 provides output data to the natural language service 204 that the natural language service 204 uses to generate the response data 146. For example, the third party service 304 may provide a transcript of the response to the natural language service 204, and the natural language service 204 may generate the response data 146 based on the transcript of the response. In still other examples, the third party service 304 transmits the response data 146 directly to the communication device 102.

Because the communication device 102 (i.e., the processor 134) inserts the third party command phrase 322 into the spoken command 140 to generate the modified spoken command data 144 before transmitting the modified spoken command data 144 to the natural language service 204, the natural language service 204 detects the third party command phrase 322 and interacts with the third party service 304 to provide the response data 146 accordingly. Thus, a user of the communication device 102 can access third party functions via the natural language service 204 without uttering the third party command phrase 322 associated with the third party service.

In a particular example, the communication device detects the phrase "Play music" as the spoken command 140. In response to associating the command "Play music" with Music Application 1 (e.g., the third party service 304), the communication device 102 adds the phrase "on Music Application 1" (e.g., the third party command phrase 322) to the spoken command 140. Thus, the modified spoken command data 144 represents the phrase "Play music on Music Application 1." The natural language service 204 parses the modified command and determines that the modified command is to be resolved by the Music Application 1 service based on the phrase "on Music Application 1." Accordingly, the natural language service 204 transmits a transcript of the command "Play music on Music Application 1" to the Music Application 1 service. In response to the transcript, the Music Application 1 service begins to stream music to the communication device 102 via the natural language service 204. In other examples, the music stream may be established directly between the Music Application 1 service and the communication device 102. Accordingly, a user may interact with the Music Application 1 service via the communication device 102 and the natural language service 204 without uttering the phrase "on Music Application 1" that is associated with triggering the natural language service 204 to interact with the Music Application 1 service.

Referring to FIG. 4, a diagram 400 illustrating a use case in which the communication device 102 transmits both the modified spoken command data 144 (including the third party command phrase 322 depicted in FIG. 3) and the spoken command data 142 to the natural language service 204 is shown. As described above, the natural language service 204 transmits the third party data 346 to the third party service 304 based on the modified spoken command data 144 and receives the response data 146 from the third party service 304. The natural language service 204 transmits the response data 146 to the communication device 102. In addition, the natural language service 204 processes the spoken command data 142 according to the natural language service provided by the natural language service 204. Based on the spoken command data 142, the natural language service 204 generates and transmits additional response data 404 to the communication device 102.

In some examples, the communication device 102 determines which of the response data 404, 146 to use to generate output audio based on content of the response data 146 of the response from the third party service 304. In cases where the response data 146 from the third party service 304 corresponds to an error, the communication device 102 outputs audio based on the additional response data 404 from the natural language service 204. In the illustrated example, the communication device 102 outputs the response audio 150 based on the response data 146 from the third party service 304 (e.g., because the response data 146 does not correspond to an error message). In other examples, the communication device 102 generates the response audio 150 based on both the response data 146 and the additional response data 404. Thus, in contrast to FIG. 3 in which the communication device 102 selectively modifies spoken commands, the example of FIG. 4 illustrates a use case in which the communication device 102 modifies each detected spoken command, transmits the modified spoken command and the original spoken command to the natural language service, and selectively generates audio output.

Referring to FIG. 5, a diagram 500 illustrating a use case in which the communication device 102 modifies the spoken command 140 by expanding and/or replacing a phrase 520 included in the spoken command. In the illustrated example, the communication device 102 replaces the phrase 520 with an expanded phrase 540 in response to determining that the phrase 520 is associated with the expanded phrase 540. In some embodiments, the communication device 102 stores a mapping of phrases to expanded phrases. The communication device 102 may generate the mapping based on input received from a user.

The modified spoken command data 144 represents the spoken command 140 with the phrase 520 replaced by the expanded phrase 540. Accordingly, a user may interact with the natural language service 204 using the expanded phrase by uttering the phrase 520.

In an illustrative example, a user accesses a configuration setting of the communication device 102 and maps the phrase "Play music with setup A" to the expanded phrase "Play music in living room at volume level 5 via Music service 1." During use, in response to detecting the phrase "Play music with setup A," the communication device 102 expands the phrase to "Play music in living room at volume level 5 via Music service 1" and transmits the expanded phrase to the natural language service 204. Accordingly, the user may initiate a relatively lengthy spoken command by uttering a relatively shorter phrase.

Referring to FIG. 6, a diagram 600 illustrating the communication device generating the modified spoken command data 144 by removing a first wake-up phrase 620 from the spoken command 140 and inserting a second wake-up phrase 622 into the spoken command 140. The communication device 144 then transmits the modified spoken command data 144 to a second natural language service 604 associated with the second wake-up phrase 622. The communication device 102 receives the response data 146 from the second natural language service 604.

The communication device 102 replaces the first wake-up phrase 620 with the second wake-up phrase 622 in response to determining to use the second natural language service 604 rather than the first natural language service 602 to process the spoken command 140. The communication device 102 determines which of the natural language services 602, 604 to use based on one or more factors as explained above. While only two natural language services 602, 604 are illustrated, in some examples the communication device 102 selects from more than two natural language services.

In an illustrative example of the use case illustrated by FIG. 6, the communication device 102 detects "Wake up service 1, play music" as the first wake-up phrase 620. The phrase "wake up service 1" is a wake-up phrase associated with the first natural language service 602. In response to determining that the second natural language service 604 is better suited to processing the phrase "play music" (e.g., due to cost, historical accuracy, etc.) the communication device 102 changes the spoken command to "Wake up service 2, play music" and transmits the changed spoken command to the second natural language service 604. Thus, a spoken command may be routed to a more effective natural language service than the one selected by the user.

Referring to FIG. 7, a diagram 700 illustrating the communication device 102 transmitting modified spoken command data to more than one natural language service rather than selecting one natural language service is shown. As illustrated, the communication device 102 inserts the first wake-up phrase 620 into the spoken command 140 to generate the modified spoken command data 144. The communication device 102 further generates additional spoken command data 744 by inserting the second wake-up phrase into the spoken command 140. The communication device 102 transmits the modified spoken command data 144 to the first natural language service 602 and transmits the additional modified spoken command data 744 to the second natural language service 604.

The first natural language service 602 processes the modified spoken command data 144 and generates the response data 146. Similarly, the second natural language service 604 processes the additional modified spoken command data 744 and generates additional response data 746. The first natural language service 602 transmits the response data 146 to the communication device, and the second natural language service 604 transmits the additional response data 746 to the communication device 102.

In the illustrated example, the communication device 102 generates the response audio 150 based on the response data 146. In some implementations, the communication device 102 selects which of the response data 146, 746 to use to generate the response audio 150 based on content of the responses, based on a policy, based on historical scores associated with the natural language services 602, 604 processing particular commands, or a combination thereof. To illustrate, the communication device 102 may select a response that does not indicate an error. An example of a policy is "select the response from service A if the response does not indicate an error." In some implementations, the communication device 102 generates the response audio 150 based on more than response. For example, the communication device 102 may generate the response audio 150 based on both the response data and the additional response data 746. Thus, FIG. 7 illustrates an example in which the communication device 102 solicits responses to a spoken command from more than one natural language service and selectively outputs audio based on the responses.

The examples illustrated in FIGS. 2-7 may be used in combination. In a particular example, the communication device 102 generates the modified spoken command data 144 by inserting the wake-up phrase 222 and the third party command phrase 322 into the spoken command 140. Thus, FIGS. 2-7 illustrate various techniques for modifying a spoken command that may be used individually or in combination.

Figure 8:
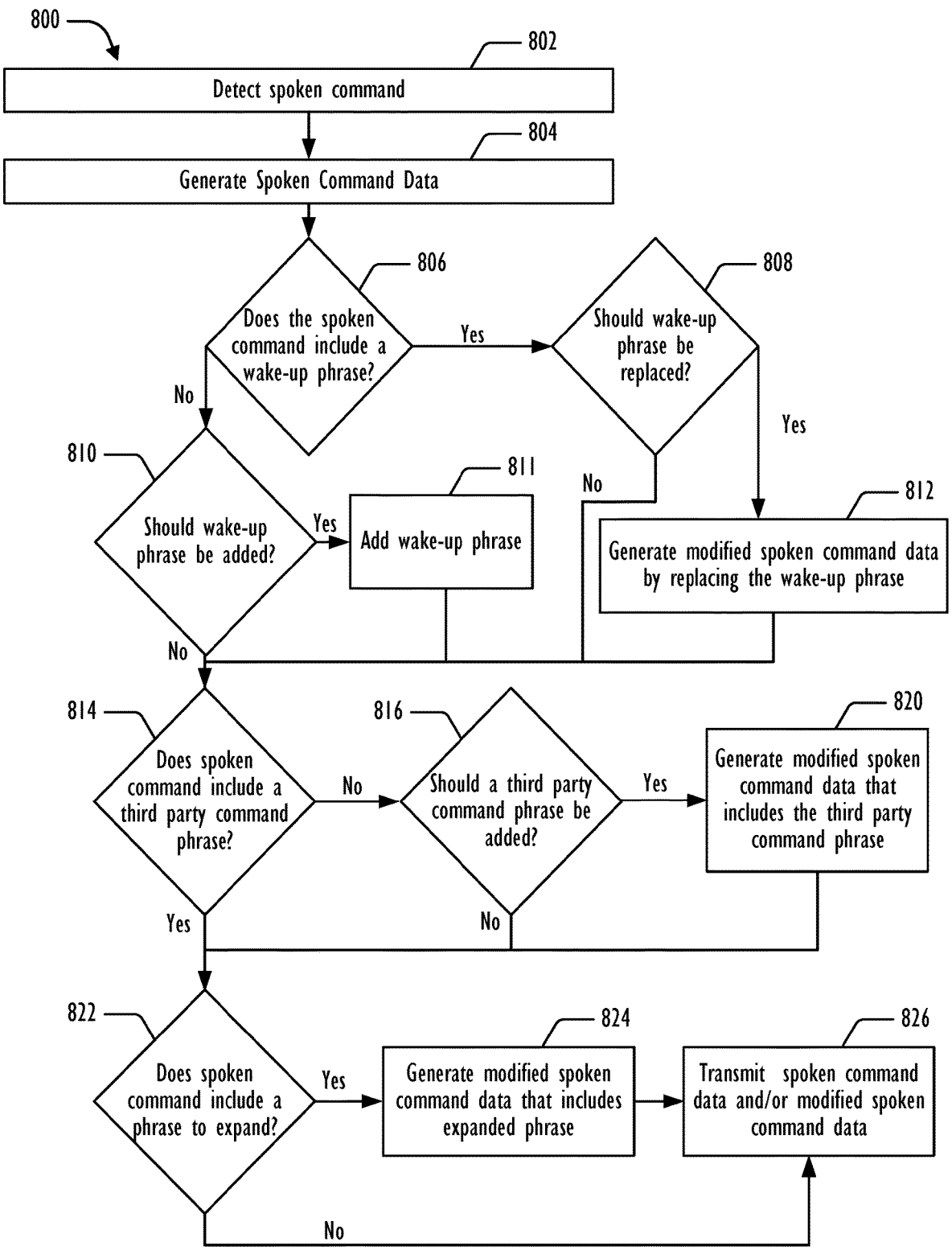
FIG. 8 is a flowchart of a method for modifying spoken commands.

Referring to FIG. 8, an illustration of a method 800 for modifying spoken commands is shown. In particular embodiments, the method 800 is performed by a communication device, such as the communication device 102. The method 800 includes detecting a spoken command, at 802. For example, the sound sensor 130 of the communication device 102 detects the spoken command 140. The method 800 further includes generating spoken command data, at 804. For example, the sound sensor 130 generates the spoken command data 142. The method 800 further includes determining whether the spoken command includes a wake-up phrase, at 806. For example, the communication device 102 determines whether the spoken command data 142 includes a wake-up phrase associated with a natural language service. The method 800 further includes determining whether a wake-up phrase is to be added in response to determining that the spoken command does not include a wake-up phrase, at 810. If a wake-up phrase is to be added, the method includes adding a wake-up phrase, at 811. For example, as illustrated in FIG. 2, the communication device 102 generates the modified spoken command data 144 by inserting the wake-up phrase 222 into the spoken command 140.

The method 800 further includes, in response to determining that the spoken command includes a wake-up phrase, determining whether the wake-up phrase should be replaced, at 808. For example, the communication device 102 determines whether to replace the first wake-up phrase 620 with the second wake-up phrase 622, as illustrated in FIG. 6.

The method 800 further includes, in response to determining that the wake-up phrase should be replaced, generating modified spoken command data by replacing the wake-up phrase at 812. For example, the communication device 102 generates the modified spoken command data 144 by replacing the first wake-up phrase 620 with the second wake-up phrase 622, as illustrated in FIG. 6.

The method 800 further includes after generating modified spoken command data by adding or replacing a wake-up phrase or after determining that a wake-up phrase should not be added or replaced, determining whether the spoken command includes a third party command phrase, at 814. For example, the communication device 102 determines whether the spoken command data 142 includes a third party command phrase, as illustrated in FIG. 3.

The method 800 further includes in response to determining that the spoken command does not include a third party command phrase, determining whether a third party command phrase should be added to the spoken command, at 816. For example, the communication device 102 determines whether to add the third party command phrase 322 to the spoken command data 142, as illustrated in FIG. 3, based on data indicating that the spoken command 140 is associated with the third party service 304. Alternatively, the communication device 102 determines to add the third party command phrase 322 to each spoken command, as illustrated in FIG. 4.

The method 800 further includes, in response to determining that third party command phrase should be added, generating modified spoken command data that includes the third party command phrase, at 820. For example, the communication device 102 adds the third party command phrase to the modified spoken command data 144, as shown in FIGS. 3 and 4.

The method 800 further includes, in response to determining that the spoken command includes a third party command phrase, that no third party command phrase should be added to the spoken command, or that modified spoken command data that includes the third party command phrase has been generated, determining whether the spoken command and/or modified spoken command includes a phrase to expand, at 822. In response to determining that the spoken command and/or the modified spoken command includes a phrase to expand, the method 800 further includes generating modified spoken command data that includes an expanded phrase, at 824. For example, the communication device 102 may replace the phrase 520 in the spoken command 140 with the expanded phrase 540 in the modified spoken command data 144.

The method 800 further includes, in response adding the expanded phrase or determining not to add the expanded phrase, transmitting the spoken command data and/or the modified spoken command data, at 826. For example, the communication device 102 transmits the modified spoken command data 144, the spoken command data 142, or a combination thereof to a natural language service. In some implementations, the communication device 102 further determines whether to send additional modified spoken command data to additional natural language services, as illustrated in FIG. 7.

Thus, FIG. 8 illustrates an example of a method usable to modify a spoken command. A device operating according to the method described enables a user to interact with a natural language service without speaking a wake-up phrase associated with the natural language service. The device operating according to the method further enables the user to access one or more third party services to process spoken commands that are not directly supported by the natural language service without speaking a command phrase associated with the third party service. In addition, the device operating according to the method enables the user to utter a relatively short phrase to activate a command associated with a relatively longer expanded phrase. Accordingly, a device operating according to the method of FIG. 8 may be more convenient to use as compared to other devices that interact with natural language services.

Figure 9:
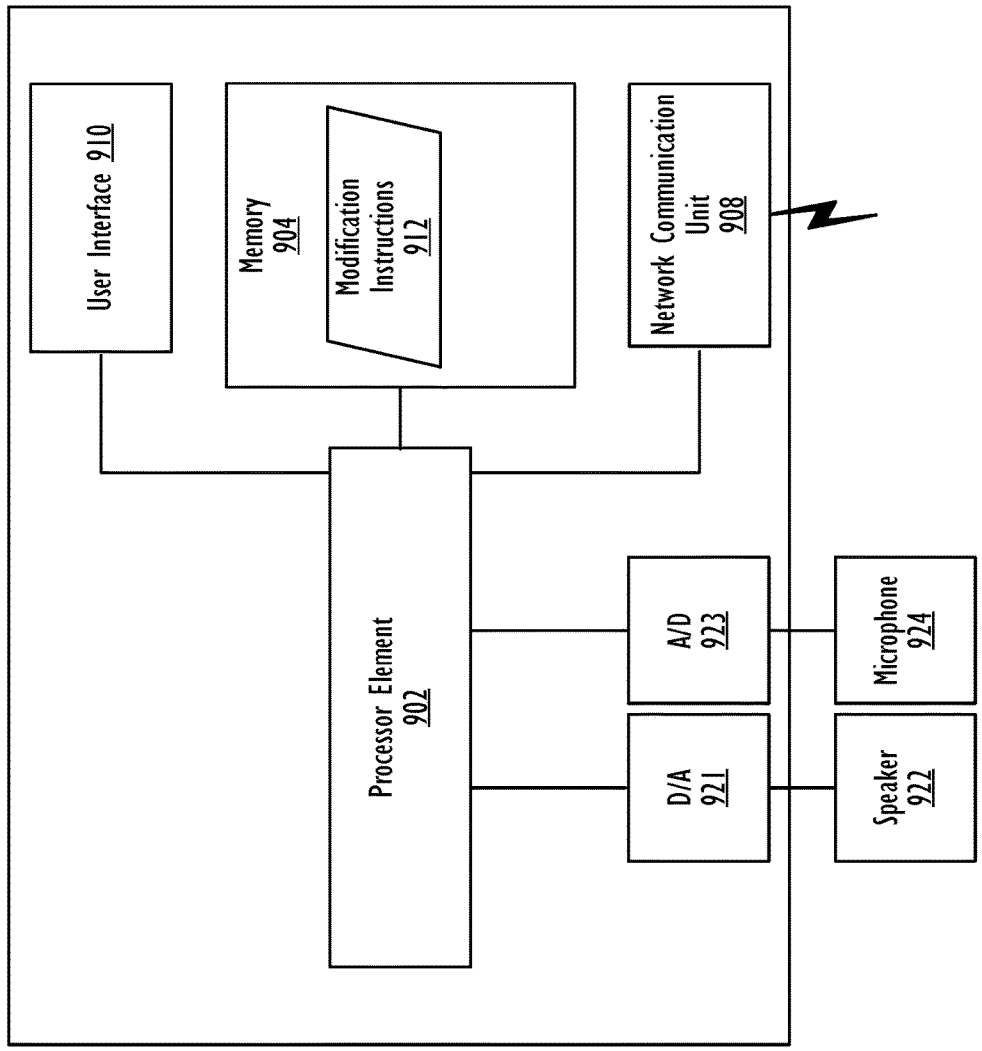
FIG. 9 illustrates a computing device corresponding to a communication device and operable to perform one or more methods disclosed herein.

Referring now to FIG. 9, a block diagram illustrates a computing device 900 that is usable to implement the techniques described herein in accordance with one or more embodiments. For example, in some implementations, the computing device 900 corresponds the communication device 102. As shown in FIG. 9, the computing device 900 can include one or more input/output devices, such as a network communication unit 908 that could include a wired communication component and/or a wireless communications component, which can be coupled to processor element 902. The network communication unit 908 corresponds to one or more transceiver unit(s) that utilize one or more of a variety of standardized network protocols, such as Wi-Fi, Ethernet, TCP/IP, etc., to effect communications between devices.

The computing device 900 includes a processor element 902 that contains one or more hardware processors, where each hardware processor has a single or multiple processor cores. In one embodiment, the processor element 902 includes at least one shared cache that stores data (e.g., computing instructions) that are utilized by one or more other components of processor element 902. In a particular example, the shared cache corresponds to locally cached data stored in a memory for faster access by components of the processor element 902. In one or more embodiments, the shared cache includes one or more mid-level caches, such as level 2 (L2), level 3 (L3), level 4 (L4), or other levels of cache, a last level cache (LLC), or combinations thereof. Examples of processors include, but are not limited to, a central processing unit (CPU), a microprocessor, and a digital signal processor (DSP), a graphics processing unit (GPU), an application specific integrated circuit (ASIC), and a field-programmable gate array (FPGA). In some implementations, the processor element 902 corresponds to the processor 134.

FIG. 9 illustrates that a memory 904 is operatively coupled to the processor element 902. In some embodiments, the memory 904 corresponds to a non-transitory medium configured to store various types of data. In an illustrative example, the memory 904 includes one or more memory devices that comprise a non-volatile storage device and/or volatile memory. Examples of non-volatile storage devices include disk drives, optical drives, solid-state drives (SSDs), tap drives, flash memory, read only memory (ROM), and/or any other type memory designed to maintain data for a duration time after a power loss or shut down operation. An example of volatile memory is random access memory (RAM). In the illustrated example, the memory 904 stores modification instructions 912. The modification instructions 912 are executable by the processor element 902 to perform one or more of the operations or methods described with respect to FIGS. 1-8. In particular, the modification instructions 912 are executable by the processor element 902 to generate modified spoken command data by adding a spoken phrase to the spoken command.

Persons of ordinary skill in the art are aware that software programs may be developed, encoded, and compiled in a variety computing languages for a variety software platforms and/or operating systems and subsequently loaded and executed by the processor element 902. In one embodiment, the compiling process of the software program transforms program code written in a programming language to another computer language such that the processor element 902 is able to execute the programming code. For example, the compiling process of the software program may generate an executable program that provides encoded instructions (e.g., machine code instructions) for processor element 902 to accomplish specific, non-generic, particular computing functions.

After the compiling process, the encoded instructions are then loaded as computer executable instructions or process steps to the processor element 902 from storage (e.g., the memory 904) and/or embedded within the processor element 902 (e.g., cache). The processor element 902 executes the stored instructions or process steps in order to perform operations or process steps to transform the computing device into a non-generic, particular, specially programmed machine or apparatus. Stored data, e.g., data stored by a storage device, can be accessed by the processor element 902 during the execution of computer executable instructions or process steps to instruct one or more components within the computing device 900.

In the example of FIG. 9, the computing device further includes a user interface 910 can include a display, positional input device (such as a mouse, touchpad, touchscreen, or the like), keyboard, or other forms of user input and output devices. The user interface 910 can be coupled to processor element 902. Other output devices that permit a user to program or otherwise use the computing device can be provided in addition to or as an alternative to network communication unit 908. When the output device is or includes a display, the display can be implemented in various ways, including by a liquid crystal display (LCD) or a cathode-ray tube (CRT) or light emitting diode (LED) display, such as an OLED display. Some implementations of the computing device do not include the user interface 910.

The computing device 900 further includes a digital to analog converter (D/A) 921 coupled to the processor element 902 and to a speaker 922. In some implementations, the DIA 921 and the speaker 922 correspond to the audio output device 136. The computing device 900 further includes an analog to digital converter (AID) 923 coupled to the processor element 902 and to a microphone 924. In some implementations, the AID 923 and the microphone 924 correspond to the sound sensor 130. The microphone 924 and the AID 923 are configured to generate a digital representation of a spoken command detected by the microphone 924 to the processor element 902. The DI A 921 and the speaker 922 are configured to output an acoustic signal based on a digital representation of a response received from the processor element 902. It should be noted that, in some embodiments, the computing device 900 comprises other components, such as sensors and/or powers sources, not explicitly shown in FIG. 9.

As discussed above, the systems and methods described above with reference to FIGS. 1-9 enable a system to modify a spoken command by adding a spoken phrase to the spoken command such that a user is able to interact with a natural language service without speaking a wake-up phrase associated with the natural language service. Further modification of the spoken command allows the user to engage one or more third party services to process spoken commands that are not directly supported by the natural language service without speaking a command phrase associated with the third party service. Accordingly, the device may be more convenient to use as compared to other devices that interact with natural language services.

In a first particular example, the computing device 900 corresponds to a smart speaker, such as an Amazon Echo® device (Amazon Echo is a registered trademark of Amazon Technologies, Inc. of Seattle, Washington). The smart speaker device is configured to receive and respond to voice commands spoken by a user. In a second particular example, the computing device 900 corresponds to a different type of device executing an intelligent personal assistant service, such as Alexa® (Alexa is a registered trademark of Amazon Technologies, Inc. of Seattle, Washington), that is responsive to voice commands. In particular use cases, the smart speaker modifies spoken commands prior to transmitting the spoken commands to a backend associated with the natural language service or to a third party service.

In a third particular example, the computing device 900 corresponds to a conference endpoint device (e.g., a video and/or voice conference device). The conference endpoint device is configured to exchange audio and/or video signals with another conference endpoint during a video or audio conference. The conference endpoint device is further configured to respond to voice commands using one or more natural language recognition services, such as Alexa®, Siri® (Siri is a registered trademark of Apple Inc. of Cupertino, California), Cortana® (Cortana is a registered trademark of Microsoft Corporation of Redmond, Washington), etc. The conference endpoint modifies detected spoken commands, as described herein, before transmitting the spoken commands to the natural language recognition service(s) for processing.

In a first use case of the third particular example, the conference endpoint detects that a user has spoken a command (e.g., "Play music I'll like.") but has not spoken a wake up phrase (e.g., "Alexa") associated with a natural language recognition service. The conference endpoint modifies the spoken command by prepending the wake up phrase and then transmits the modified spoken command (e.g., "Alexa, play music I'll like") to the natural language recognition service. Accordingly, the natural language recognition service will detect the wake up phrase and then process the spoken command. The conference endpoint receives a response to the spoken command from the natural language service and responds accordingly. To illustrate, the conference endpoint may output music received from the natural language recognition service in response to the spoken command.

In a second use case of the third particular example, the conference endpoint detects that a user has spoken a command (e.g., "Play music") associated with a third party skill registered to the natural language service without speaking a phrase associated with activating the third party skill. For example, the user may say "play music" without saying "on Spotify®" (Spotify is a registered trademark of Spotify AB Corporation of Stockholm, Sweden). In response to detecting the spoken command, the conference endpoint modifies the spoken command by prepending or appending the phrase associated with activating the third party skill. The conference endpoint then transmits the modified spoken command (e.g., "Play music on Spotify") to the natural language recognition service. Accordingly, the natural language recognition service can forward the modified spoken command to a service (e.g., Spotify) associated with the third party skill.

In a third use case of the third particular example, the conference endpoint modifies a spoken command for use with a third party skill but transmits both the original spoken command (e.g., "Play music") and the modified spoken command (e.g., "Play music on Spotify") to the natural language recognition service. The conference endpoint determines whether to output a response from the natural language recognition service or the third party service based on content of the responses. For example, the conference endpoint may play music from Amazon in cases where an error message is received from Spotify but may play music from Spotify in cases where music is received from Spotify.

In a fourth use case of the third particular example, the conference endpoint is configured to expand shortcut phrases before transmitting to the natural language recognition service. For example, in response to receiving the command "Play music with setup A," the conference endpoint may transmit "Play music in living room at volume level 5 via Spotify" to the natural language recognition service.

In a fifth use case of the third particular example, the conference endpoint modifies a spoken command by replacing a first wake up phrase (e.g., "Alexa") with a second wake up phrase (e.g., "Cortana"). Accordingly, the conference endpoint can transmit the modified spoken command to a natural language recognition service that is more suitable for processing the spoken command. The conference endpoint may determine which natural language service is more suitable based on stored user preferences.

In a sixth use case of the third particular example, the conference endpoint generates a different version of a spoken command (e.g., "Play music") for each of several natural language recognition services. For example, the conference endpoint may send "Alexa, play music" to one service and "Cortana, play music" to another service. The conference endpoint transmits the versions of the spoken command to the corresponding natural language recognition services in parallel. The conference endpoint may receive responses from each of the natural language recognition services and decide which one to output based on user preferences, content of the responses, or a combination thereof.

As illustrated by the various examples, the disclosed embodiments represent an improvement to user interfaces that operate on detected speech. In particular, the disclosed embodiments are more resilient to user error as compared to other systems because the disclosed embodiments insert phrase a phrase inadvertently omitted from a spoken command. Further, the disclosed embodiments are more convenient to use as the length of spoken commands uttered by users may be reduced. Accordingly, the disclosed systems and methods represent an improvement to how computing devices provide user interfaces. In particular, the disclosed systems and methods represent an improvement to how computing devices process spoken commands to provide a user interface.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure.

Use of the term "optionally" with respect to any element of a claim means that the element is required, or alternatively, the element is not required, both alternatives being within the scope of the claim. Use of broader terms such as comprises, includes, and having is understood to provide support for narrower terms such as consisting of, consisting essentially of, and comprised substantially of Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments are useable in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that has a publication date after the priority date of this application.

The invention claimed is:

1. A method comprising:
obtaining, at a first conference endpoint device, spoken command data representing a spoken command detected by the first conference endpoint device;
associating the spoken command with a third party service that is to respond to a command within the spoken command using a stored data structure that associates spoken commands with third party services;
determining that the spoken command is missing a third party command phrase corresponding to the associated the third party service;
generating modified spoken command data by inserting a spoken phrase into the spoken command, the spoken phrase including the third party command phrase corresponding to the associated third party service, the modified spoken command data including, separately, a wake-up phrase, the third party command phrase, and the command; and
transmitting the modified spoken command data to a natural language service, wherein the natural language service is to interact with the associated third party service in response to detecting the third party command phrase.

2. The method of claim 1, wherein the natural language service does not support the spoken command without the third party command phrase.

3. The method of claim 1, wherein the natural language service is to transmit data to the third party service responsive to the third party command phrase, receive response data from the third party service, and transmit the data to the first conference endpoint device.

4. The method of claim 1, wherein the natural language service is to transmit data to the third party service responsive to the third party command phrase, and the third party service is to directly transmit response data to the first conference endpoint device.

5. The method of claim 1, wherein the wake-up phrase in the modified spoken command data is associated with the natural language service.

6. The method of claim 5, wherein generating the modified spoken command data further includes removing a second wake-up phrase from the spoken command, the second wake-up phrase associated with a second natural language service.

7. The method of claim 5, further comprising:
generating additional modified spoken command data by inserting an additional spoken phrase into the spoken command; and
transmitting the additional modified spoken command data to an additional natural language service.

8. The method of claim 7, further comprising:
receiving first response data from the natural language service;
receiving second response data from the additional natural language service; and
in response to the first response data indicating an error, outputting audio based on the second response data.

9. The method of claim 7, further comprising:
receiving first response data from the natural language service;
receiving second response data from the additional natural language service; and outputting audio based on the first response data and the second response data.

10. A non-transitory computer readable storage medium storing instructions that, when executed by a processor, causes the processor to:
obtain, at a first conference endpoint device, spoken command data representing a spoken command detected by the first conference endpoint device;
associate the spoken command with a third party service that is to respond to a command within the spoken command using a stored data structure that associates spoken commands with third party services;
determine that the spoken command is missing a third party command phrase corresponding to the associated third party service;
generate modified spoken command data by inserting a spoken phrase into the spoken command, the spoken phrase including the third party command phrase corresponding to the associated third party service, the modified spoken command data including, separately, a wake-up phrase, the third party command phrase, and the command; and
transmit the modified spoken command data to a natural language service, wherein the natural language service is to interact with the associated third party service in response to detecting the third party command phrase.

11. The storage medium of claim 10, wherein the natural language service does not support the spoken command without the third party command phrase.

12. The storage medium of claim 10, wherein the natural language service is to transmit data to the third party service responsive to the third party command phrase, receive response data from the third party service, and transmit the data to the first conference endpoint device.

13. The storage medium of claim 10, wherein the natural language service is to transmit data to the third party service responsive to the third party command phrase, and the third party service is to directly transmit response data to the first conference endpoint device.

14. The storage medium of claim 10, wherein the wake-up phrase in the modified spoken command data is associated with the natural language service.

15. The storage medium of claim 14, wherein to generate the modified spoken command data further includes to remove a second wake-up phrase from the spoken command, the second wake-up phrase associated with a second natural language service.

16. The storage medium of claim 14, further comprising to:
generate additional modified spoken command data by inserting an additional spoken phrase into the spoken command; and
transmit the additional modified spoken command data to an additional natural language service.

17. An apparatus comprising:
a processor; and
a memory storing instructions that, when executed by the processor, cause the processor to:
obtain, at a first conference endpoint device, spoken command data representing a spoken command detected by the first conference endpoint device;
associate the spoken command with a third party service that is to respond to a command within the spoken command using a stored data structure that associates spoken commands with third party services;
determine that the spoken command is missing a third party command phrase corresponding to the associated third party service;
generate modified spoken command data by inserting a spoken phrase into the spoken command, the spoken phrase including the third party command phrase corresponding to the associated third party service, the modified spoken command data including, separately, a wake-up phrase, the third party command phrase, and the command; and
transmit the modified spoken command data to a natural language service, wherein the natural language service is to interact with the associated third party service in response to detecting the third party command phrase.

18. The apparatus of claim 17, wherein the natural language service does not support the spoken command without the third party command phrase.

19. The apparatus of claim 17, wherein the natural language service is to transmit data to the third party service responsive to the third party command phrase, receive response data from the third party service, and transmit the data to the first conference endpoint device.

20. The apparatus of claim 17, wherein the natural language service is to transmit data to the third party service responsive to the third party command phrase, and the third party service is to directly transmit response data to the first conference endpoint device.

* * * * *